No. 708,285. Patented Sept. 2, 1902.
P. WEISE.
COMBINED MILK STRAINER AND VENTILATOR.
(Application filed Sept. 26, 1901.)
(No Model.)

INVENTOR
PAUL WEISE
BY Paul & Paul
HIS ATTORNEYS

WITNESSES

UNITED STATES PATENT OFFICE.

PAUL WEISE, OF LESTER PRAIRIE, MINNESOTA.

COMBINED MILK STRAINER AND VENTILATOR.

SPECIFICATION forming part of Letters Patent No. 708,285, dated September 2, 1902.

Application filed September 26, 1901. Serial No. 76,605. (No model.)

*To all whom it may concern:*

Be it known that I, PAUL WEISE, of Lester Prairie, McLeod county, Minnesota, have invented certain new and useful Improvements in a Combined Milk Strainer and Ventilator, of which the following is a specification.

The object of my invention is to provide a strainer of such construction that the strainer cloth or material through which the liquid passes will wear for a long time without replacing.

A further object is to provide a strainer which will effectually prevent dirt and dust from entering the can or receptacle, while permitting milk or other liquid to flow freely therethrough.

A further object is to provide a strainer which when not in use is adapted to close the top of the can and at the same time act as a ventilator for the same.

The invention consists generally in providing a strainer having an imperforate bottom upon which the liquid falls when poured therein, and perforate walls covered with suitable strainer-cloth, through which the liquid flows upon reaching the level thereof.

Further, the invention consists in providing a strainer which when inverted is adapted for use as a cover and ventilator for the receptacle whereon it is placed.

Further, the invention consists in various constructions and combinations, all as hereinafter described, and particularly pointed out in the claims.

Figure 2:
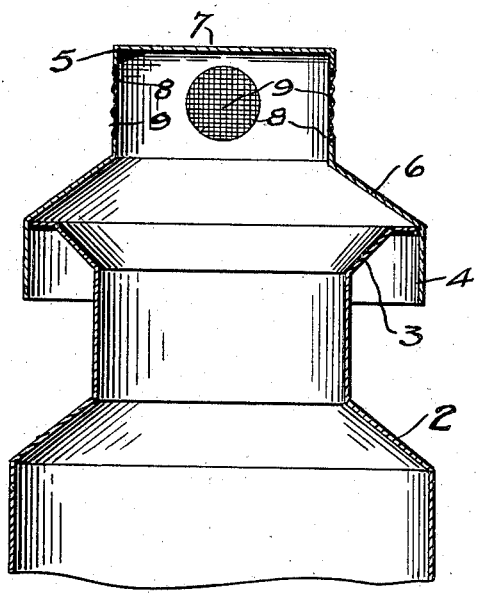
Figure 1:
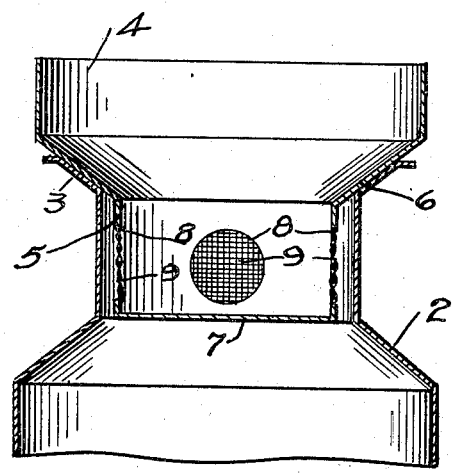
Figure 4:
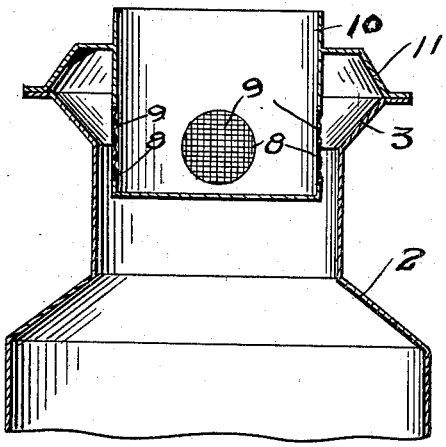
Figure 3:
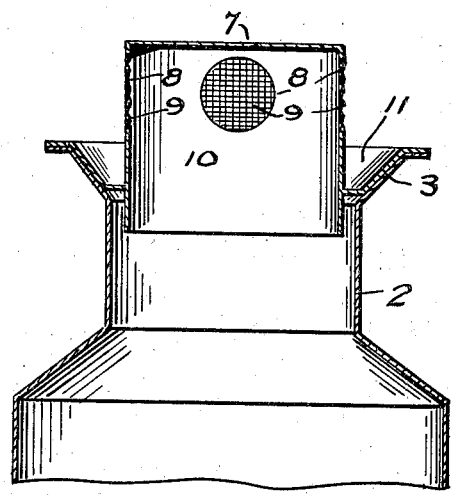

In the accompanying drawings, forming part of this specification, Figure 1 is a vertical section of the top of a milk can and strainer embodying my invention. Fig. 2 is a similar view showing the strainer inverted for use as a cover and ventilator. Fig. 3 is a sectional view showing the modified form of strainer in position to close the top of a can. Fig. 4 is a similar view showing the device inverted for use as a strainer.

In the drawings, 2 represents a milk-can top of the ordinary construction, having the usual flaring upper portion 3, whereon the milk-strainer is adapted to rest. The strainer which I prefer to employ consists of a ring 4, having straight walls, a tubular or cylindrical part 5, that is adapted to slip down into the mouth of the can, and a flaring section or ring 6, that connects the parts 4 and 5 and rests upon the flared top 3 of the can when the device is used as a strainer. The cylindrical part 5 is provided with an imperforate bottom 7 and with holes 8 in its side walls, which are covered by a suitable screen-cloth 9 of sufficient fineness of mesh to prevent the passage of dust and dirt, while allowing the milk to flow freely therethrough. These holes, as shown in Fig. 1, are above the bottom 7, so that when the milk is poured into the strainer the sediment and dirt that is mixed therewith will collect upon the bottom 7, while the milk rising to the level of the holes 8 will flow into the can through the strainer-cloth.

It has been customary where the strainer-cloth was put in the bottom of the strainer to stir the milk and hasten its passage through the cloth. I have found that the thin strainer-cloth usually employed soon becomes bent and broken by the implement used in stirring, so that in a short time holes will be formed in the cloth and the strainer will either have to be thrown away or repaired. By providing the strainer-cloth in the walls of the tubular portion instead of the bottom thereof I have avoided all this difficulty, as the act of stirring the milk will not in any way injure the strainer-cloth. Furthermore, the act of stirring the milk in the strainers as usually constructed causes a considerable portion of the dirt and sediment to pass through the cloth with the milk, which objection I have obviated by providing a solid bottom for the sediment to collect on and allowing the milk to flow out at the sides. When the can has been filled, the strainer is inverted on the top of the can, as shown in Fig. 2, the ring 4 sliding down over the top of the can, forming a close joint therewith, while the imperforate bottom 7 will exclude dirt and dust, and the holes in the sides of the strainer will allow the escape of the animal heat from the milk and thoroughly ventilate the can. A can equipped with this form of strainer may be exposed to the weather without danger of contaminating the milk, as the fine meshes of the strainer-cloth will exclude all dirt and dust from the can, and the inclined walls of the part 6 will effectually shed the rain.

In Figs. 3 and 4 I have shown a slight modification, which consists in providing a cylindrical portion 10, having an imperforate bottom and holes in its side walls corresponding to those described with reference to Fig. 1, and said cylindrical portion is inserted and secured within a flaring ring 11, that conforms to the shape of the top of the can and fits snugly thereon when the device is used as a cover and ventilator. The method of using the device shown in Figs. 3 and 4 is substantially the same as heretofore described with reference to the preferred construction.

Obviously the shape of the strainer may be modified according to the formation of the top of the can, the essential features of the invention being the strainer having the imperforate bottom and perforate side walls and adapted for use as a cover and ventilator after the straining operation has been completed.

I claim as my invention—

1. The combination with a milk-can having a flaring mouth, of a milk-can cover and strainer, consisting of a flaring ring, a cylindrical part supported from said flaring ring and provided with an imperforate bottom and having openings in its side walls above the imperforate bottom, and screen-coverings to the openings in the side walls, said screen-openings being arranged so that when the cover is in one position they will lie opposite to the walls of the neck of the can and when the cover is reversed they will be above the flaring mouth of the can and below the inverted imperforate bottom, and said flaring ring being so located that in one position it will rest on the flaring mouth portion of the can, substantially as described.

2. A milk-can cover and strainer, consisting of a ring with straight walls, a cylindrical part with an imperforate bottom and having openings in its side walls above the imperforate bottom, screen-coverings to said openings, and a flaring ring connecting said straight-walled ring and cylindrical part, said straight-walled ring projecting from the flaring ring so as to constitute an upright wall extending above the same when the device is serving as a strainer, and to constitute a depending outer wall overhanging the mouth of the can when the device is serving as a cover, and in connection with the flaring ring serving to shed rain from the cover and away from the mouth of the can, substantially as described.

In witness whereof I have hereunto set my hand this 19th day of September, 1901.

PAUL WEISE.

In presence of—
W. F. SCHMIDT,
JOHN KUHLMANN.